(12) United States Patent
Suzuki

(10) Patent No.: US 7,725,009 B2
(45) Date of Patent: May 25, 2010

(54) BATTERY DRIVEN VIDEO REPRODUCTION APPARATUS

(75) Inventor: Takuya Suzuki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1356 days.

(21) Appl. No.: 11/176,777

(22) Filed: Jul. 7, 2005

(65) Prior Publication Data
US 2006/0013570 A1   Jan. 19, 2006

(30) Foreign Application Priority Data
Jul. 15, 2004  (JP) .............................. 2004-208266

(51) Int. Cl.
*H04N 5/00*  (2006.01)
(52) U.S. Cl. .......................... 386/125; 386/95; 386/126
(58) Field of Classification Search ................. 386/125, 386/126, 95
See application file for complete search history.

(56) References Cited

U.S. PATENT DOCUMENTS

| | | | | |
|---|---|---|---|---|
| 5,532,935 | A | * | 7/1996 | Ninomiya et al. ........... 700/296 |
| 6,731,274 | B2 | * | 5/2004 | Powell ........................ 345/204 |
| 7,376,331 | B2 | * | 5/2008 | Cheng ......................... 386/46 |

FOREIGN PATENT DOCUMENTS

| | | |
|---|---|---|
| JP | 7-87379 | 3/1995 |
| JP | 2002-116736 | 4/2002 |
| JP | 2003-156728 | 5/2003 |
| JP | 2003-280627 | 10/2003 |
| JP | 2004-110456 | 4/2004 |

OTHER PUBLICATIONS

Patent Abstracts of Japan, Publication No. 2002-116736, Publication Date: Apr. 19, 2002, 1 page.
Patent Abstracts of Japan for Japanese Publication No. 2002-116736, Publication date Apr. 19, 2002, 1 page (Previously Cited).
Japanese Office Action for Japanese Application No. 2004-208266, Mailing date May 29, 2007, and English translation thereof (4 pages).
Patent Abstracts of Japan for Japanese Publication No. 2003-156728, Publication date May 30, 2003 (1 page).
Patent Abstracts of Japan for Japanese Publication No. 2003-280627, Publication date Oct. 2, 2003 (1 page).
Patent Abstracts of Japan for Japanese Publication No. 07-087379, Publication date Mar. 31, 1995 (1 page).
Patent Abstracts of Japan for Japanese Publication No. 2004-110456, Publication date Apr. 8, 2004 (1 page).

* cited by examiner

*Primary Examiner*—Thai Tran
*Assistant Examiner*—Girumsew Wendmagegn
(74) *Attorney, Agent, or Firm*—Osha • Liang LLP

(57) ABSTRACT

A video reproduction apparatus detects the remaining time of a movie being reproduced and a battery's availability and calculates therefrom power available before reproducing the movie ends, and uses the power as calculated and a table representing a relationship between the liquid crystal display device's screen brightness and power consumption to calculate and set the liquid crystal display device's screen brightness to prevent the battery from running out while the movie is being reproduced.

3 Claims, 2 Drawing Sheets

BATTERY DRIVEN VIDEO REPRODUCTION APPARATUS

BACKGROUND OF THE INVENTION

1. Field of the Invention

The present invention relates generally to video reproduction apparatuses and particularly to those including a digital versatile disk (DVD) reproduction device and a liquid crystal display device and driven by a battery.

2. Description of the Background Art

Conventionally there is a portable video reproduction apparatus including a DVD reproduction device, a liquid crystal display device and a speaker integrally and driven by a battery. The liquid crystal display device has a screen user adjustable in brightness. This video reproduction apparatus allows a movie recorded for example on a disk to be reproduced and watched at a desired location.

Furthermore there is also a liquid crystal display device having a button operated to readily switch brightness or similar quality between images displayed on a screen for normal text and that for watching motion video, respectively (see Japanese Patent Laying-Open No. 2002-116736 for example).

Such a conventional video reproduction apparatus, however, can run out of battery while the apparatus is reproducing a movie, and the user cannot watch the movie to the end.

SUMMARY OF THE INVENTION

The present invention mainly contemplates a video reproduction apparatus which does not run out of battery while the apparatus is reproducing a video program.

The present video reproduction apparatus is driven by a battery and includes: a digital versatile disk reproduction device reproducing a video signal of a video program recorded on a disk; a liquid crystal display device displaying a video image of the video program in accordance with the video signal reproduced by the digital versatile disk reproduction device; a first detector for detecting a remaining time of the video program with the video signal being reproduced by the digital versatile disk reproduction device; a second detector for detecting the battery's availability; a calculator using the video program's remaining time detected by the first detector and the battery's availability detected by the second detector for calculating power available before reproducing the video program ends; a memory having stored therein one of a table and a mathematical expression representing a relationship between the liquid crystal display device's screen brightness and power consumption; and a setter for setting the liquid crystal display device's screen brightness as based on a calculation performed thereby of a brightness corresponding to power calculated by the calculator using one of the table and mathematical expression stored in the memory.

The present video reproduction apparatus detects the remaining time of a movie being reproduced and a battery's availability and calculates therefrom power available before reproducing the movie ends, and uses the power as calculated and a table representing a relationship between the liquid crystal display device's screen brightness and power consumption to calculate and set the liquid crystal display device's screen brightness to prevent the battery from running out while the movie is being reproduced.

The foregoing and other objects, features, aspects and advantages of the present invention will become more apparent from the following detailed description of the present invention when taken in conjunction with the accompanying drawings.

BEST MODE FOR CARRYING OUT THE INVENTION

Figure 1:
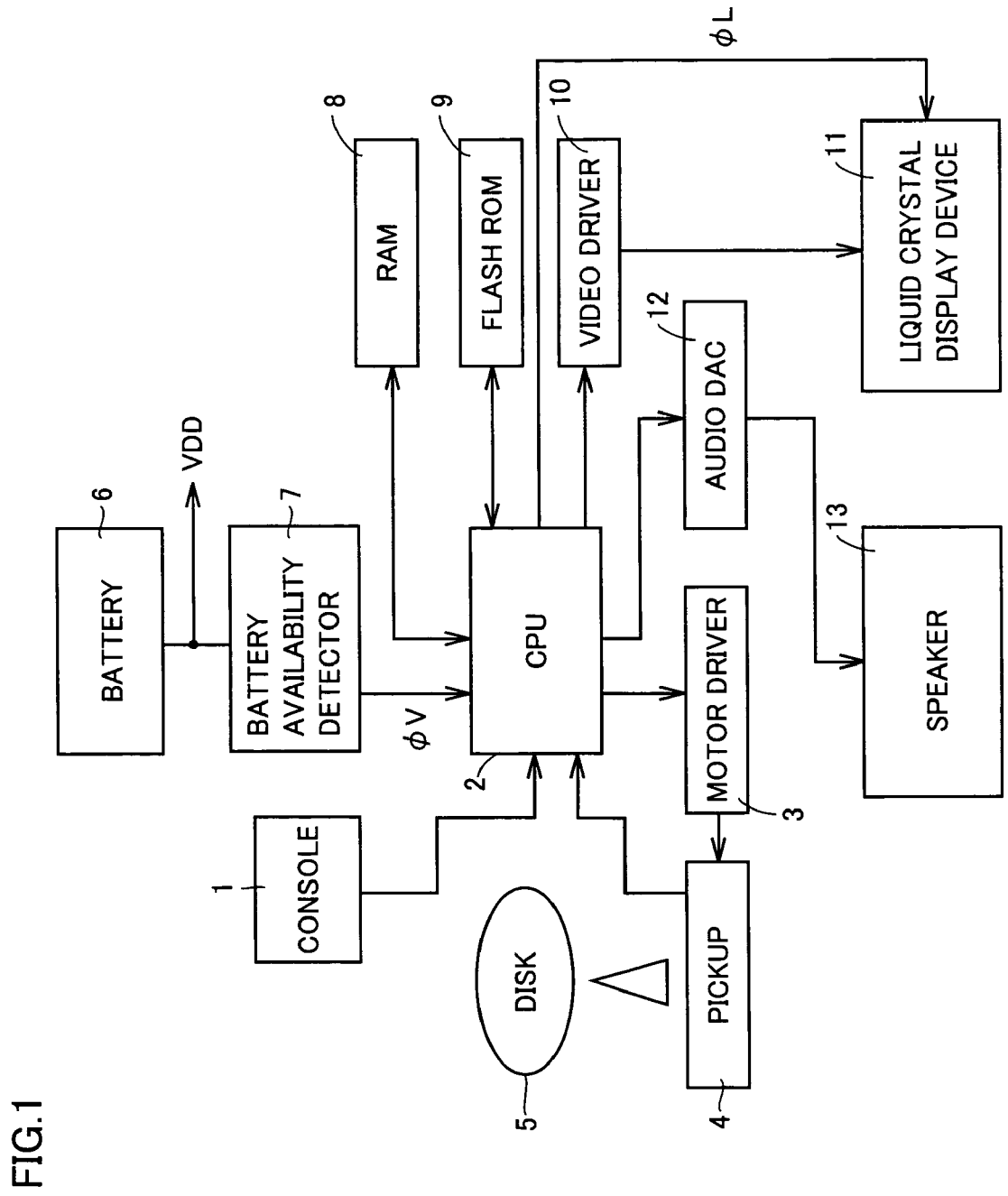
FIG. 1 is a block diagram of a configuration of the present portable video reproduction apparatus in one embodiment.

FIG. 1 is a block diagram of a configuration of the present portable video reproduction apparatus in one embodiment. In the figure, the apparatus includes a console 1, a central processing unit (CPU) 2, a motor drive 3 and a pickup 4 and receives a disk 5 set therein.

Console 1 is operated by a user to enter instructions such as reproduction, stop, ejection, brightness adjustment, and the like. CPU 2 operates in response to the instructions received via console 1 to generally control the video reproduction apparatus. Motor driver 3 operates in response to a signal received from CPU 2 to output a drive signal to drive pickup 4. Pickup 4 is driven by the drive signal to scan a surface of the set disk, and read information recorded on the disk and provide the read information to CPU 2.

Furthermore the video reproduction apparatus also includes a battery 6, a battery availability detector 7, a random access memory (RAM) 8, a flash read only memory (flash ROM) 9, a video driver 10, a liquid crystal display device 11, an audio digital analog converter (audio DAC) 12, and a speaker 13.

Battery 6 is a rechargeable battery and supplies a power supply battery VDD to the entirety of the video reproduction apparatus. Battery availability detector 7 detects the battery 6 availability from the battery's voltage VDD and outputs to CPU 2 a signal φV indicating the detected availability. RAM 8 temporarily stores information input via console 1 and is used as a working memory when CPU 2 performs a prescribed operation. Flash ROM 9 has stored therein a variety of programs required for controlling the video reproduction apparatus, a table, as indicated below, representing a relationship between the liquid crystal display device 11 screen brightness and power consumption.

TABLE 1

| Liquid Crystal Brightness (cd/m$^2$) | Power Consumption (W) |
|---|---|
| 500 | 16 |
| 400 | 13 |
| 300 | 12 |
| 200 | 10 |

CPU 2 uses information read by pickup 4 from disk 5 to calculate the remaining time of the video program being reproduced, and uses the calculated remaining time and the battery 6 availability indicated by signal φV to calculate maximum power available before reproducing the video program ends. Furthermore, CPU 2 uses the calculated maximum power and the table read from flash ROM 8 to obtain the liquid crystal display device 11 screen brightness and provides a signal φL indicating that brightness to liquid crystal display device 11.

Furthermore, CPU 2 uses information read by pickup 4 from disk 5 to reproduce video and audio signals which are in turn provided to video driver 10 and audio DAC 12, respectively.

Video driver 10 operates in response to the video signal received from CPU 2 to output a drive signal to drive liquid crystal display device 11. Liquid crystal display device 11 operates in response to the drive signal received from video driver 10 to display a video image. The liquid crystal display device 11 screen brightness is set to a level corresponding to signal φL output from CPU 2. Liquid crystal display device 11 for example includes a backlight and in response to signal φL the backlight's power supply voltage is controlled to control the liquid crystal display device 11 screen brightness.

Audio DAC 12 receives a digital audio signal from CPU 2 to convert the signal to an analog audio signal and provide it to speaker 13. Speaker 13 operates in response to the analog audio signal received from the audio DAC to output sound.

Figure 2:
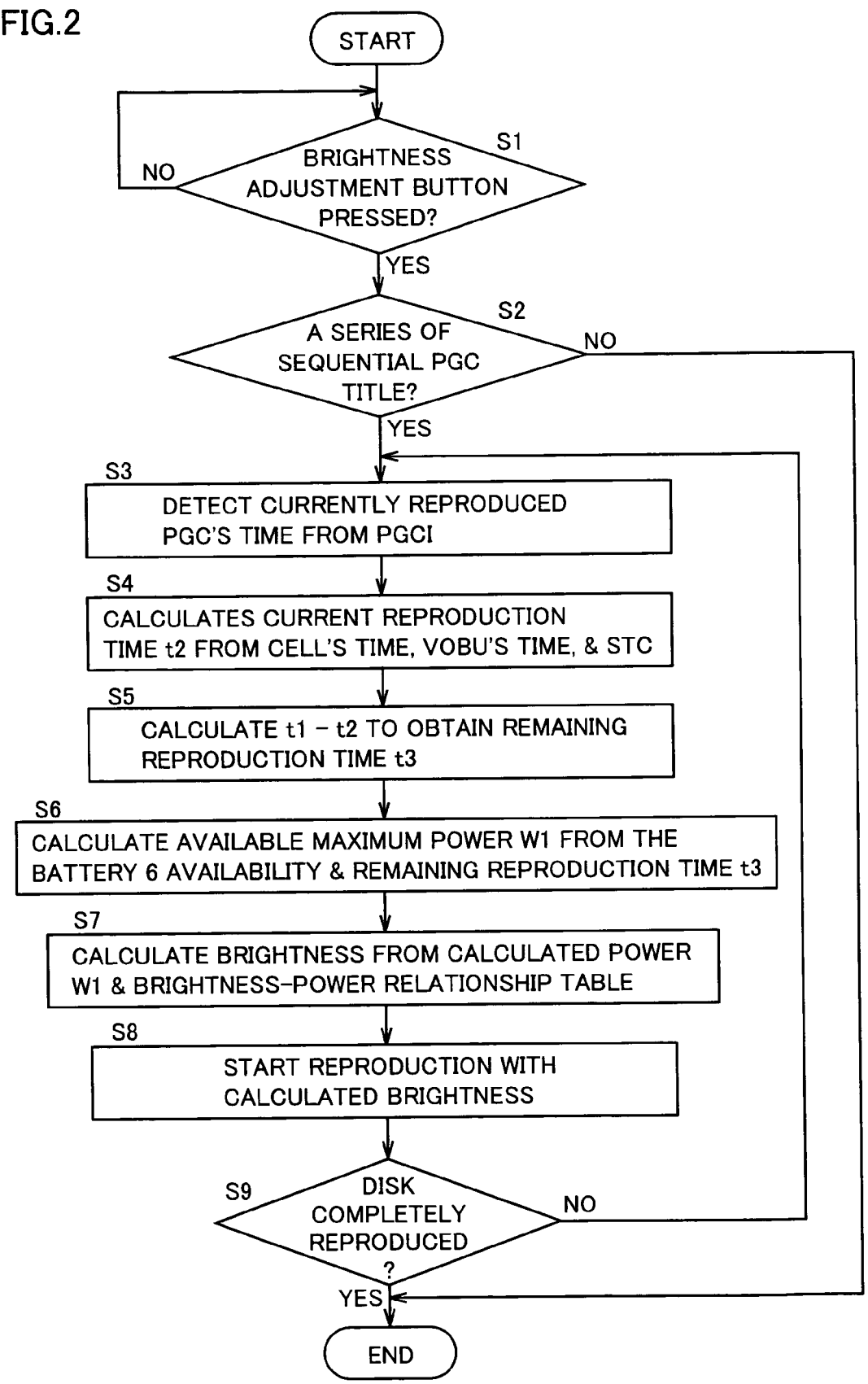
FIG. 2 is a flow chart of an operation of the FIG. 1 apparatus.

FIG. 2 is a flow chart of an operation setting in brightness a screen of liquid crystal display device 11 shown in FIG. 1. In FIG. 2 at step S1 CPU 2 is reproducing a main part of a movie recorded on disk 5 and is also waiting for a user to press a brightness adjustment button of console 1. When the button is pressed then at step S2 CPU 2 determines whether information output from pickup 4 is a series of sequential program chain (PGC) title, and if not then it is difficult to calculate the movie's remaining time and accordingly brightness adjustment is not effected and thus ends.

If the information from pickup 4 is a series of sequential PGC title then at step S3 the PGC's, i.e., the movie's time t1 is detected from control information PGCI. Then at step S4 the current reproduction time (i.e., a time so far consumed for reproduction) t2 is calculated from a cell's time, a video object unit's (VOBU's) time, and STC. Then at step S5 t1 minus t2 is calculated to provide a remaining reproduction time t3=t1−t2 of the movie being reproduced.

Then at step S6 CPU 2 uses the availability of battery 6 indicated by signal φV output from battery availability detector 7 and the calculated remaining reproduction time t3 to calculate maximum power W1 available before reproducing the movie ends. Battery 6 degrades as it is used, how long battery 6 is used may be considered to correct power W1.

Then at step S7 CPU 2 uses the calculated maximum power W1 and the brightness-power consumption table stored in flash RAM 9 to calculate the liquid crystal display device 11 screen brightness and provide signal φL indicating the calculated brightness level to liquid crystal display device 11. At step S8 the liquid crystal display device 11 screen brightness is set to a level corresponding to signal φL received from CPU 2 and a video image is thus reproduced with that brightness.

At step S9 a decision is made as to whether the disk has completely been reproduced. If not the control returns to step S3, otherwise the brightness adjustment operation ends. As such, after the brightness adjustment button is pressed steps S3-S9 are repeated periodically, as predetermined, until reproduction ends.

In the present embodiment a remaining time of a movie being reproduced and availability of battery 6 are used to calculate available power and set the liquid crystal display device 11 screen brightness to that corresponding to the calculated power to prevent battery 6 from running out, resulting in preventing a user from watching the movie being reproduced.

Furthermore, if the video reproduction apparatus for example provides vibration resulting in pickup 4 moving, error correction and the like and accordingly requires further power, steps S3-S9 repeated periodically as predetermined allow the liquid crystal display device 11 screen brightness to be re-set to prevent battery 6 from running out while a movie is being reproduced.

Note that in the present embodiment a table representing a relationship between the liquid crystal display device 11 screen brightness and power consumption is stored in flash ROM 9, and maximum power W1 calculated and the table are used to obtain the liquid crystal display device 11 screen brightness. Alternatively, a mathematical expression representing a relationship between the liquid crystal display device 11 screen brightness and power consumption may be stored in flash ROM 9, and maximum power W1 calculated and the mathematical expression may be used to obtain the liquid crystal display device 11 screen brightness.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video reproduction apparatus driven by a battery, comprising:
    a digital versatile disk reproduction device reproducing a video signal of a video program recorded on a disk;
    a liquid crystal display device displaying a video image of said video program in accordance with said video signal reproduced by said digital versatile disk reproduction device;
    first detection means for detecting a remaining time of said video program with said video signal being reproduced by said digital versatile disk reproduction device;
    second detection means for detecting said battery's availability;
    calculation means using said video program's remaining time detected by said first detection means and said battery's availability detected by said second detection means for calculating power available before reproducing said video program ends;
    a memory having stored therein one of a table and a mathematical expression representing a relationship between said liquid crystal display device's screen brightness and power consumption; and
    means for setting said liquid crystal display device's screen brightness as based on a calculation performed thereby of a brightness corresponding to power calculated by said calculation means using one of said table and mathematical expression stored in said memory,
    wherein said first detection means determines whether information from said digital versatile disk reproduction device is a sequential PGC title when a brightness adjustment button is pressed, and if said information is said sequential PGC title said first detection means detects based on said information said remaining time of said video program being reproduced, and if said information is not said sequential PGC title said first detection means ends adjusting brightness.

2. A video reproduction apparatus driven by a battery, comprising:
    video signal reproduction means for reproducing a video signal of a video program recorded in a storage medium;
    a video display device displaying a video image of said video program in accordance with said video signal reproduced by said video signal reproduction means;
    first detection means for detecting a remaining time of said video program with said video signal being reproduced by said video signal reproduction means;

second detection means for detecting said battery's availability;

calculation means using said video program's remaining time detected by said first detection means and said battery's availability detected by said second detection means for calculating power available before reproducing said video program ends; and means for setting said video display device's screen brightness as based on power calculated by said calculation means, wherein said video signal reproduction means is a digital versatile disk reproduction device, said video display device is a liquid crystal display device, and said first detection means determines whether information from said digital versatile disk reproduction device is sequential PGC title when a brightness adjustment button is pressed, and if said information is said sequential PGC title said first detection means detects based on said information said remaining time of said video program being reproduced, and if said information is not said sequential PGC title said first detection means ends adjusting brightness.

3. The video reproduction apparatus according to claim 2, further comprising a memory having stored therein one of a table and a mathematical expression representing a relationship between said video display device's screen brightness and power consumption, wherein said means sets said liquid crystal display device's screen brightness as based on a calculation performed thereby of a brightness corresponding to power calculated by said calculation means using one of said table and mathematical expression stored in said memory.

* * * * *